(12) United States Patent
Detmer et al.

(10) Patent No.: US 11,966,705 B2
(45) Date of Patent: Apr. 23, 2024

(54) SYSTEMS AND METHODS FOR BOT DIALOG DELEGATION

(71) Applicant: FMR LLC, Boston, MA (US)

(72) Inventors: Allen Detmer, Boston, MA (US); Maria Lucena, Boston, MA (US)

(73) Assignee: FMR LLC, Boston, MA (US)

( * ) Notice: Subject to any disclaimer, the term of this patent is extended or adjusted under 35 U.S.C. 154(b) by 112 days.

(21) Appl. No.: 17/097,174

(22) Filed: Nov. 13, 2020

(65) Prior Publication Data

US 2021/0142009 A1 May 13, 2021

Related U.S. Application Data

(60) Provisional application No. 62/934,897, filed on Nov. 13, 2019.

(51) Int. Cl.
*G06F 40/35* (2020.01)
*G06N 5/04* (2023.01)
*H04L 51/02* (2022.01)

(52) U.S. Cl.
CPC .............. *G06F 40/35* (2020.01); *G06N 5/04* (2013.01); *H04L 51/02* (2013.01)

(58) Field of Classification Search
CPC .... G06F 40/35; G06F 40/30; G06F 16/90332; G06F 16/9538
See application file for complete search history.

(56) References Cited

U.S. PATENT DOCUMENTS

| | | | |
|---|---|---|---|
| 9,172,747 B2 | 10/2015 | Walters et al. | |
| 9,318,108 B2 | 4/2016 | Gruber et al. | |
| 2017/0324867 A1* | 11/2017 | Tamblyn | H04L 65/1093 |
| 2018/0025726 A1* | 1/2018 | Gatti de Bayser | G10L 15/22 704/257 |
| 2018/0337872 A1* | 11/2018 | Fawcett | G06F 8/31 |
| 2019/0089655 A1* | 3/2019 | Uppala | H04L 51/02 |
| 2019/0180258 A1* | 6/2019 | Amar | H04L 51/02 |
| 2019/0188590 A1* | 6/2019 | Wu | G06N 7/005 |
| 2019/0258456 A1* | 8/2019 | Byun | G06F 40/35 |
| 2020/0081939 A1* | 3/2020 | Subramaniam | G06F 16/90332 |
| 2020/0126540 A1* | 4/2020 | Panchamgam | G10L 15/26 |
| 2020/0364300 A1* | 11/2020 | Tan | G06N 20/00 |
| 2021/0004390 A1* | 1/2021 | Li | G06F 16/285 |

* cited by examiner

*Primary Examiner* — Wilson W Tsui
(74) *Attorney, Agent, or Firm* — Cesari and McKenna, LLP

(57) ABSTRACT

Systems and methods for switching between natural language processing units during an interaction using a dialog delegation processor. The method includes receiving a dialog utterance from a user via a user device. The method further includes determining a general intent based on the dialog utterance using a general natural language processor. The method also includes determining at least one specific intent corresponding to the general intent using the general natural language processor. The method also includes selecting a specific natural language processor corresponding to the at least one specific intent. The method further includes determining a dialog response corresponding to the at least one of specific intent using the specific natural language processor. The method also includes generating for display the dialog response on the user device.

10 Claims, 10 Drawing Sheets

SYSTEMS AND METHODS FOR BOT DIALOG DELEGATION

CROSS REFERENCE TO RELATED APPLICATION

This application claims the benefit of and priority to U.S. Provisional Patent Application No. 62/934,897, filed Nov. 13, 2019, the entire contents of which are owned by the assignee of the instant application and incorporated herein by reference in their entirety.

FIELD OF THE INVENTION

The present invention relates generally to systems and methods for interacting with a user using natural language processing units, including systems and methods for switching between natural language processing units during an interaction.

BACKGROUND OF THE INVENTION

Generally, modern online customer services involve the use of chatbots or virtual assistants ("VAs") as a first line of interaction for a user. Chatbots or VAs use Natural Language Processing ("NLP") to read, decipher, and understand the interaction with the user. The capabilities and inherently supported actions of Natural Language Processing units vary depending on the context of the interactions and the sophistication of the NLP units. Most chatbots or VAs can support simple Q&A interactions but are limited when asked to perform substantive tasks.

For example, organizations with large digital presences often require multiple chatbots or VAs to assist users across it's many online services. Ideally, when a user interacts with an online service having multiple VAs, the user is unaware of which chatbot or VA they are interacting with during the interaction. Therefore, there is a need for systems and methods that allow for the interconnection of all of the chatbots or VAs within an organization, avoiding duplication of conversation flows with a single user and facilitating handoffs between chatbots or VAs.

SUMMARY OF THE INVENTION

Accordingly, an object of the invention is to provide systems and methods for switching between natural language processing units during an interaction. It is an object of the invention to provide systems and methods for switching between natural language processing units during an interaction using a dialog delegation processor. It is an object of the invention to provide systems and methods for determining user intents based on dialog utterances from a user. It is an object of the invention to provide systems and methods for selecting natural language processors corresponding to user intents. It is an object of the invention to provide systems and methods for determining a dialog response corresponding to the user intent using a natural language processor. It is an object of the invention to provide systems and methods for resolving dialog incomprehension using a dialog delegation processor.

In some aspects, a method for switching between natural language processing units during an interaction using a dialog delegation processor includes receiving, by a server computing device, intent declarations. Each intent declaration includes a set of phrases corresponding to an intent of a user. The method further includes receiving, by the server computing device, a dialog utterance from the user via a user device. The method also includes, comparing, by the server computing device, the dialog utterance with each of the intent declarations using a general natural language processor. The method also includes determining, by the server computing device, a general intent based on the comparison of the dialog utterance with each of the intent declarations using the general natural language processor. The general intent includes specific intents.

Further, the method includes determining, by the server computing device, at least one of the specific intents corresponding to the general intent based on the comparison of the dialog utterance with each of the intent declarations using the general natural language processor. The method also includes selecting, by the server computing device, a specific natural language processor corresponding to the at least one of the specific intents. Further, the method includes determining, by the server computing device, a dialog response corresponding to the at least one of the specific intents using the specific natural language processor. The method also includes generating, by the server computing device, for display the dialog response on the user device.

In some embodiments, the server computing device is further configured to determine a second specific intent corresponding to the general intent. For example, in some embodiments, the server computing device is further configured to select a second specific natural language processor corresponding to the second specific intent. In some embodiments, the server computing device is further configured to determine a second dialog response corresponding to the second specific intent using the second specific natural language processor. For example, in some embodiments, the server computing device is further configured to generate for display the second dialog response on the user device.

In some embodiments, the server computing device is further configured to determine an incomprehension based on the dialog utterance using the general natural language processor. For example, in some embodiments, the server computing device is further configured to, in response to determining the incomprehension, generate for display an error message on the user device.

In some aspects, a system for switching between natural language processing units during an interaction using a dialog delegation processor includes a server computing device communicatively coupled to a user device over a network. The server computing device is configured to receive intent declarations. Each intent declaration comprises a set of phrases corresponding to an intent of a user. The server computing device is also configured to receive a dialog utterance from the user via the user device. Further, the server computing device is configured to compare the dialog utterance with each of the intent declarations using a general language processor. The server computing device is also configured to determine a general intent based on the comparison of the dialog utterance with each of the intent declarations using the general natural language processor. The general intent includes specific intents.

Further, the server computing device is configured to determine at least one of the specific intents corresponding to the general intent based on the comparison of the dialog utterance with each of the intent declarations using the general natural language processor. The server computing device is further configured to select a specific natural language processor corresponding to the at least one of the specific intents. The server computing device is also configured to determine a dialog response corresponding to the at least one of the specific intents using the specific natural language processor. Further, the server computing device is configured to generate for display the dialog response on the user device.

In some embodiments, the server computing device is further configured to determine a second specific intent corresponding to the general intent. For example, in some embodiments, the server computing device is further configured to select a second specific natural language processor corresponding to the second specific intent. In some embodiments, the server computing device is further configured to determine a second dialog response corresponding to the second specific intent using the second specific natural language processor. For example, in some embodiments, the server computing device is further configured to generate for display the second dialog response on the user device.

In some embodiments, the server computing device is further configured to determine an incomprehension based on the dialog utterance using the general natural language processor. For example, in some embodiments, the server computing device is further configured to, in response to determining the incomprehension, generate for display an error message on the user device.

In some aspects, a method for resolving dialog incomprehension using a dialog delegation processor includes receiving, by a server computing device, a dialog utterance from a user via a user device. The method further includes determining, by the server computing device, an incomprehension based on the dialog utterance using a general natural language processor. The method also includes, in response to determining the incomprehension, incrementing, by the server computing device, an incomprehension count. The method also includes, in response to determining that the incomprehension count exceeds one, initiating, by the server computing device, a search language processor. Further, the method includes, in response to determining that the incomprehension count exceeds two, generating, by the server computing device, for display a query message corresponding to a user option. The method also includes, in response to determining that the incomprehension count exceeds three, generating, by the server computing device, for display an error message.

In some embodiments, the search language processor is configured to determine an intent based on the dialog utterance. For example, in some embodiments, the server computing device is further configured to select a natural language processor corresponding to the determined intent. In some embodiments, the server computing device is further configured to determine a dialog response corresponding to the determined intent using the natural language processor.

In other embodiments, the user option includes speaking with a human. In some embodiments, the server computing device is further configured to receive a rephrased dialog utterance from the user via the user device.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for switching between natural language processing units during an interaction. The system and methods can include mechanisms or methods for switching between natural language processing units during an interaction using a dialog delegation processor. The systems and methods described herein can provide systems and methods for determining user intents based on dialog utterances from a user. The systems and methods described herein can include one or more mechanisms or methods for selecting natural language processors corresponding to user intents. The systems and methods described herein can facilitate users with systems and methods for determining a dialog response corresponding to the user intent using a natural language processor. The systems and methods described herein can facilitate users with systems and methods for resolving dialog incomprehension using a dialog delegation processor.

Figure 1:
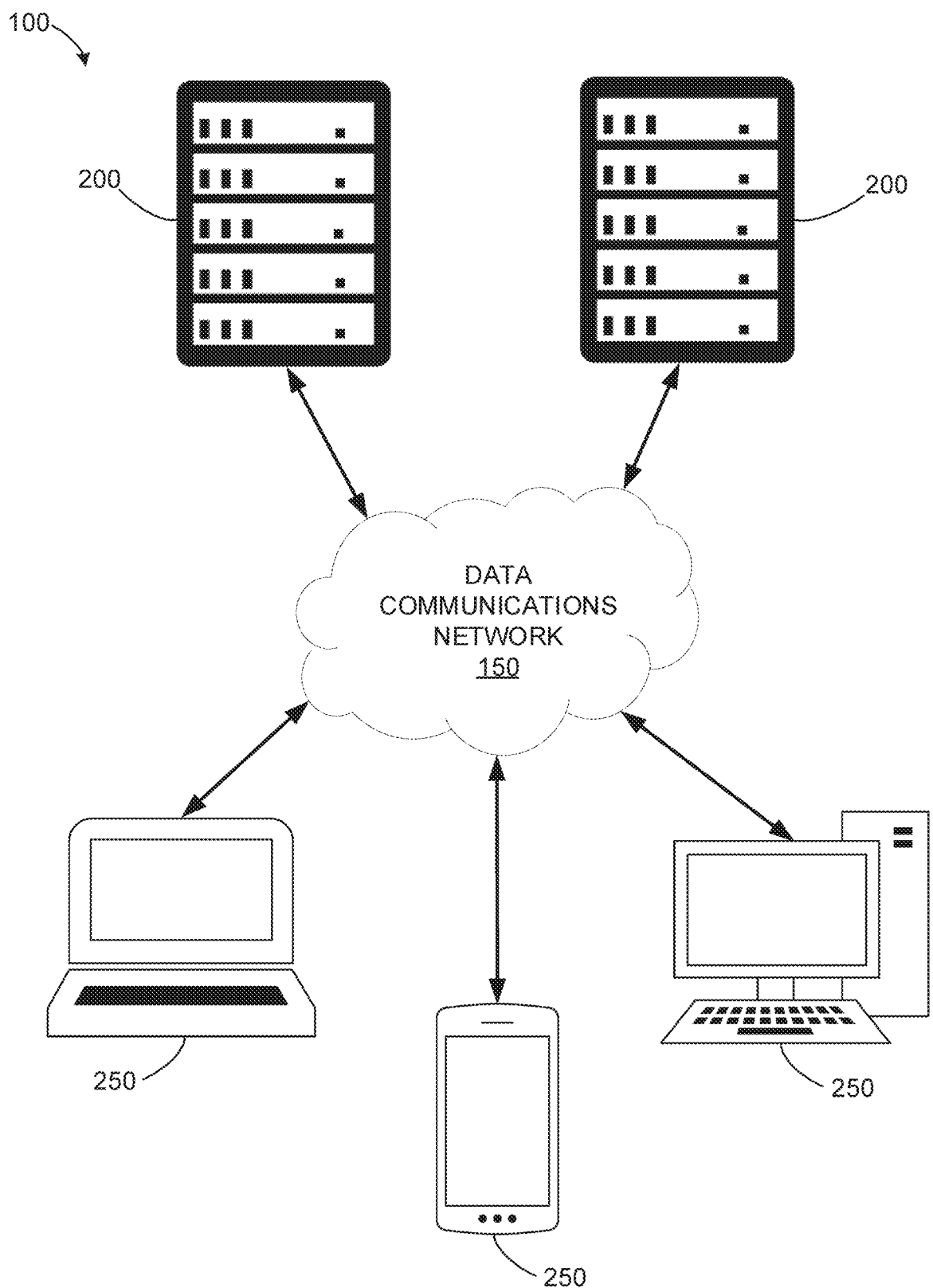
FIG. 1 is a block diagram of an exemplary data communications network, according to embodiments of the technology described herein.
Figure 2:
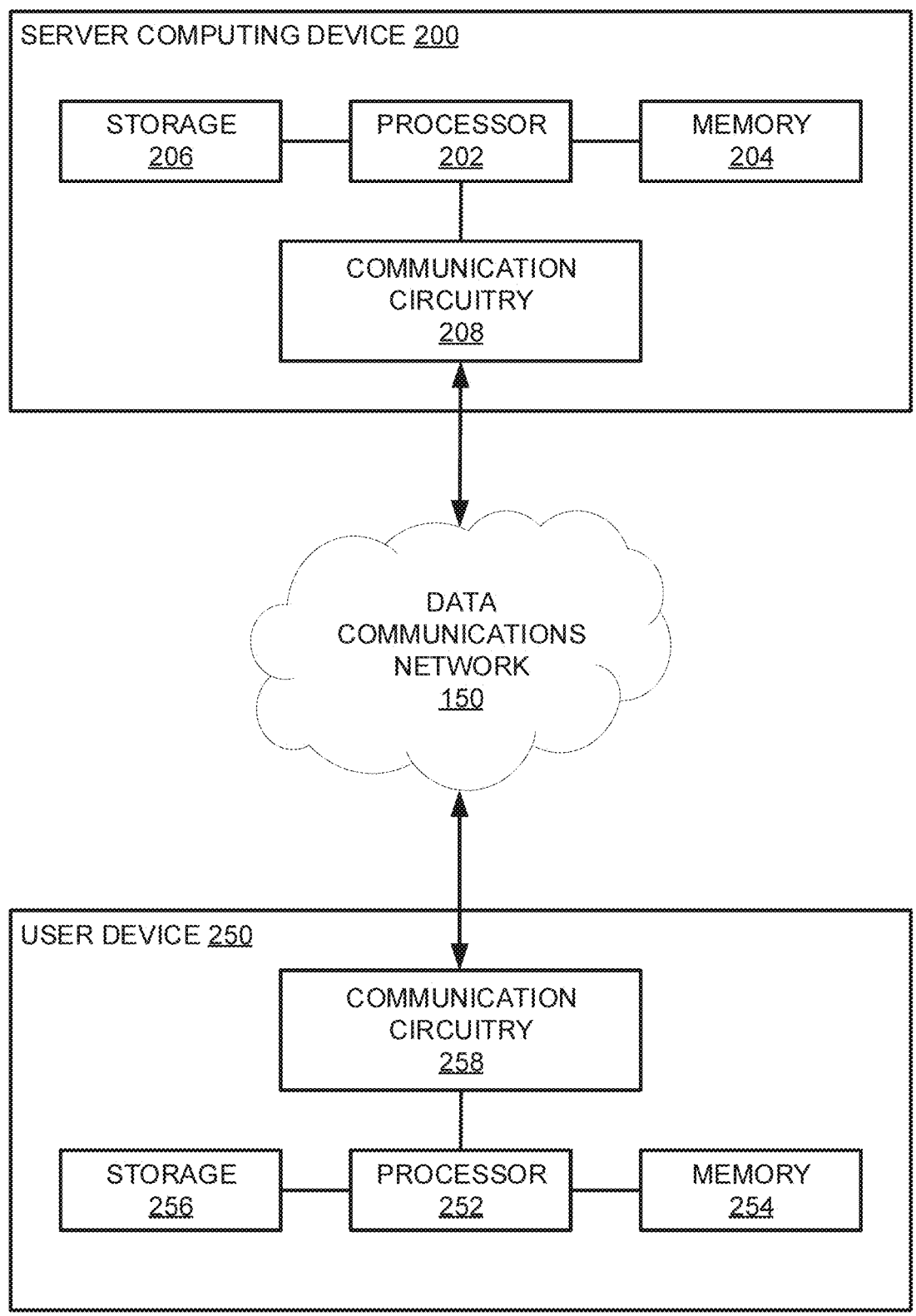
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

Figure 3:
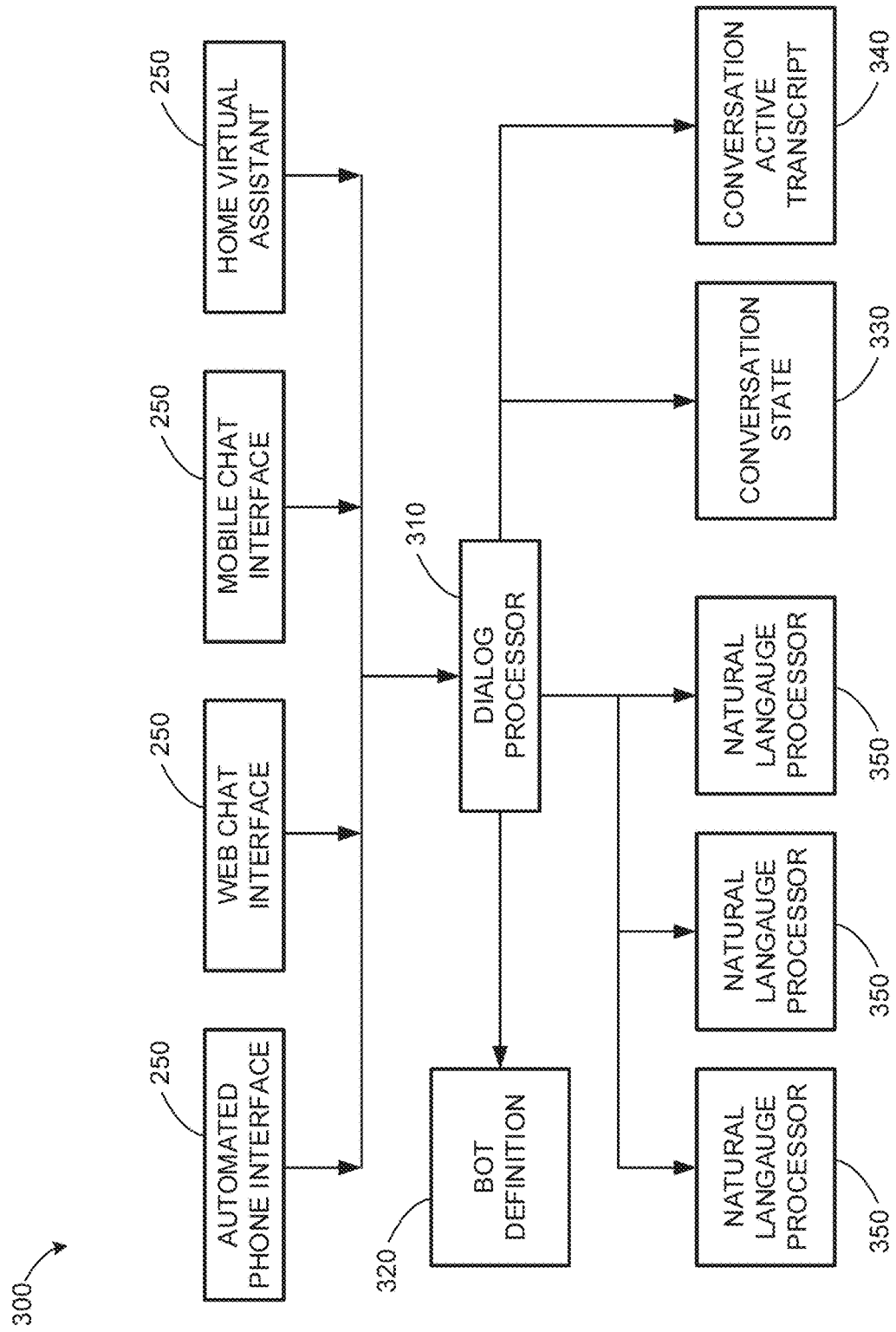
FIG. 3 is a diagram showing a visualization of an exemplary architecture for a dialog processing system, according to embodiments of the technology described herein.

FIG. 3 illustrates an exemplary dialog processing system 300 using user devices 250 and dialog delegation processor 310. A dialog delegation processor 310 can reuse a conversational flow regardless of the origin of the interaction and the knowledge base where the conversational flow is defined. When dialog delegation is activated, an intent known to the system via a dialog delegate configuration, can be initiated transparently for the user on a different NLP 350 or VA that triggers the flow, and then returns back to the NLP 350 the user started interacting with. This means different online service teams can create different conversational flows, and these can all be reused.

The dialog delegate functionality makes use of the existing mechanism which handles fetching bot and dialog definitions 320, and moving through the scripted dialogs until a response is available to the user. This process can be implemented in strategic places in order to programmatically or declaratively indicate when a delegation to a separate dialog is needed. The configuration object consists of two basic fields: dialogId—a unique identifier of a dialog defined in the system's content store which holds conversation/intent flow declarations, triggerUtterance—the utterance to send to the NLP 350 so it can start the targeted dialog, which based on the conditions or scripted flow, needs to be commenced at this point, and isInitializing/isActive runtime flags. The conversation state 330 and conversation active transcript 340 are stored in the system's content store or database.

Current configurations hold an array of declared dialogs (which may come from multiple bots, but same NLPs 350 or different NLPs 350 to be used in order. The dialog processing system 300 will loop through these dialogs until an intent is matched or return either an incomprehension or an escalation if the declared NLPs 350 are not able to match the user utterance. Using the dialog delegation processor 310, the dialog processing system 300 does not have to loop through all of the declared dialogs because the dialog delegation processor 310 forces an interaction with a specific dialog which is known to the conversation flow designers to be able to handle the user intended action and remain on that dialog until the action is fulfilled.

Figure 4:
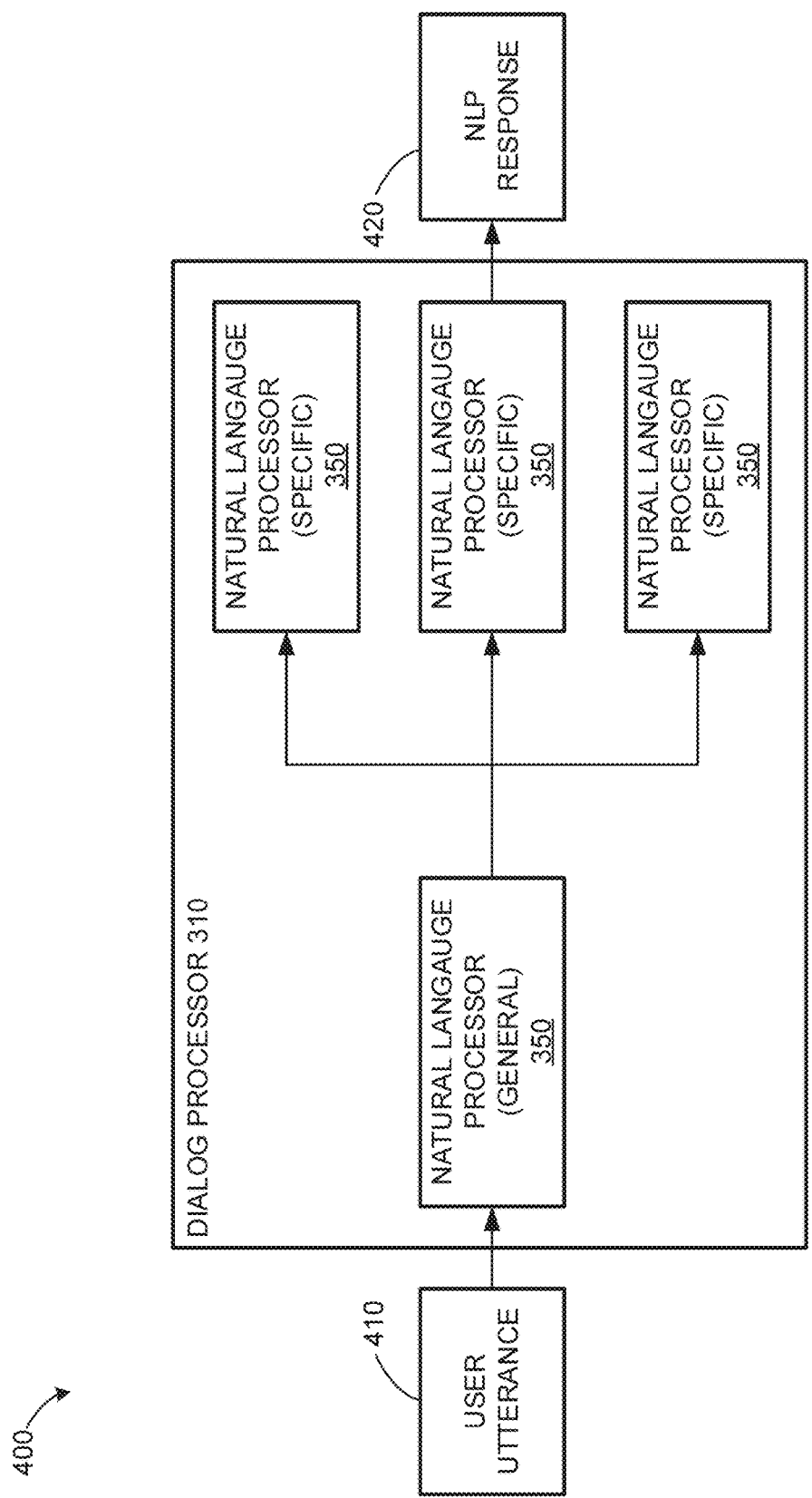
FIG. 4 is a diagram showing a visualization of an exemplary dialog delegation processor of the exemplary dialog processing system of FIG. 3, according to embodiments of the technology described herein.

As illustrated by FIG. 4, during an interaction 400, the user is unaware of any switching between bots or NLPs 350; the user presents an utterance 410 and they are presented with the dialog responses 420 as they are available. Conversation flows are aware of the content available to the dialog processing system 300, and can use the content to facilitate the user requests. Once the intent has been fulfilled, the dialog delegation processor 310 clears its status and the process can commence once again. The dialog delegation processor 310 also allows for multiple delegations during an interaction.

In some embodiments, the dialog processing system 300 delegates intent definitions into multiple hots. For example, there is a starting NLP 350 that classifies the customer's main intent, and then routes the request, via dialog delegation, to the NLP 350 ready to handle the fulfillment. Depending on the channel, the NLP 350 may use different NLPs 350. Part of this solution addresses strengths and weakness of different NLPs 350, for example a particular NLP 350 may classify the intent because it classifies intents better, and have another NLP 350 with the full-blown definition handle fulfillment. In other embodiments, different organizations maintain their own domain expertise content. In this scenario there is a main NLP 350 that is in charge of routing the request to the hot with the correct domain content. At runtime, the implementation of dialog delegation has not had to be enhanced, but rather this is a pattern that relies on bot configurations and conversation flow design. This embodiment takes the effort off the system and places in the hands of those who maintain the different training models.

Figure 5:
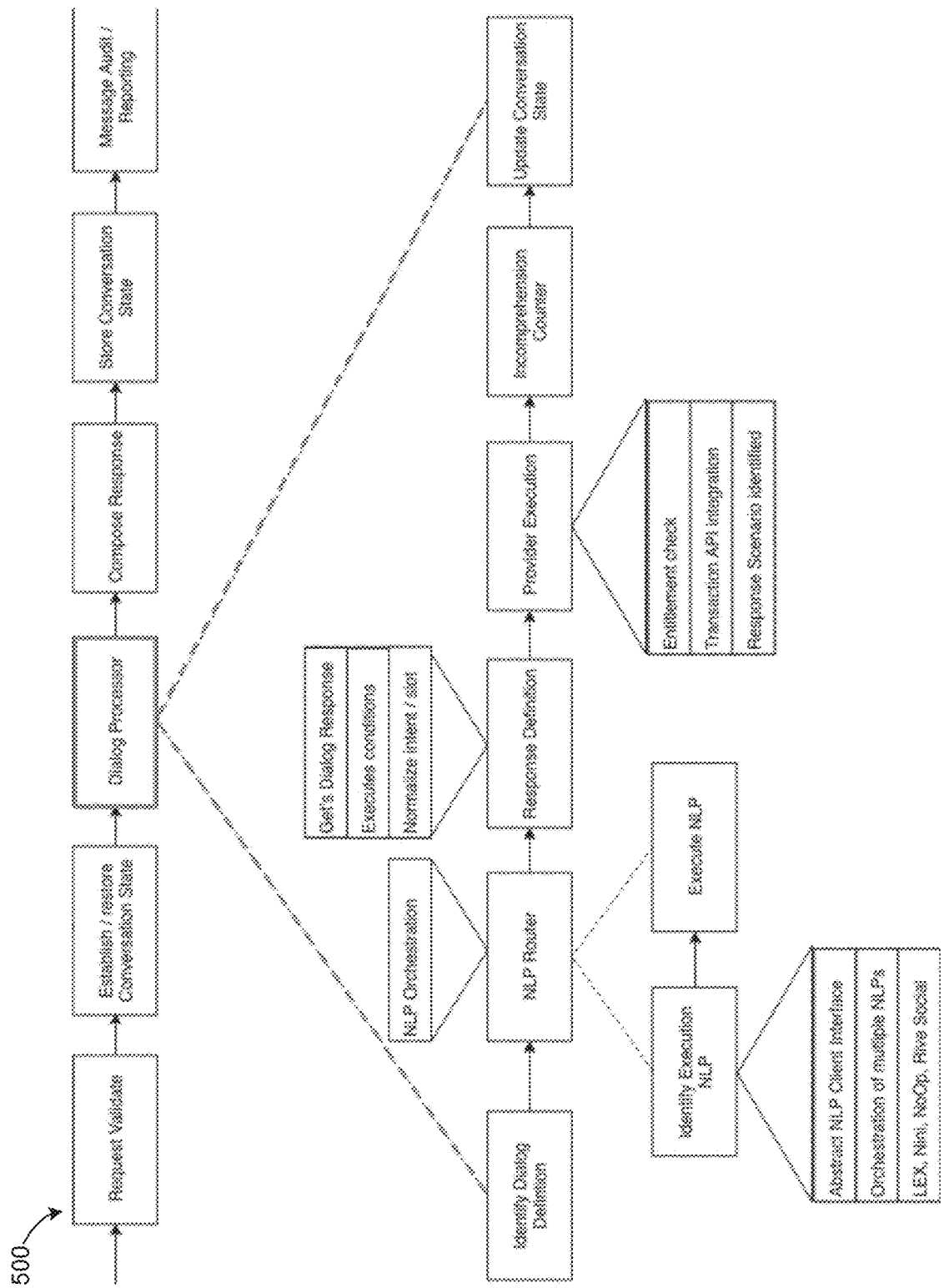
FIG. 5 is a diagram showing a visualization of an exemplary process for switching between natural language processing units during an interaction using the exemplary dialog delegation processor of FIG. 4, according to embodiments of the technology described herein.

As illustrated in FIG. 5, in some embodiments, the dialog delegation processor 310 is the part of the dialog processing system that resolves the response template to present to the user. NLPs 350 within the system have a many-to-many relationship with dialog definitions. In prior art systems, the only way to specify the dialogs a NLP 350 could interact with, was by adding them in order of precedence to the NLP 350's configuration dialogs array. The dialog processing system 350, however, will loop through these dialogs while the user's utterance 410 hasn't been classified, and then on a match and dialog state changes.

Figure 6:
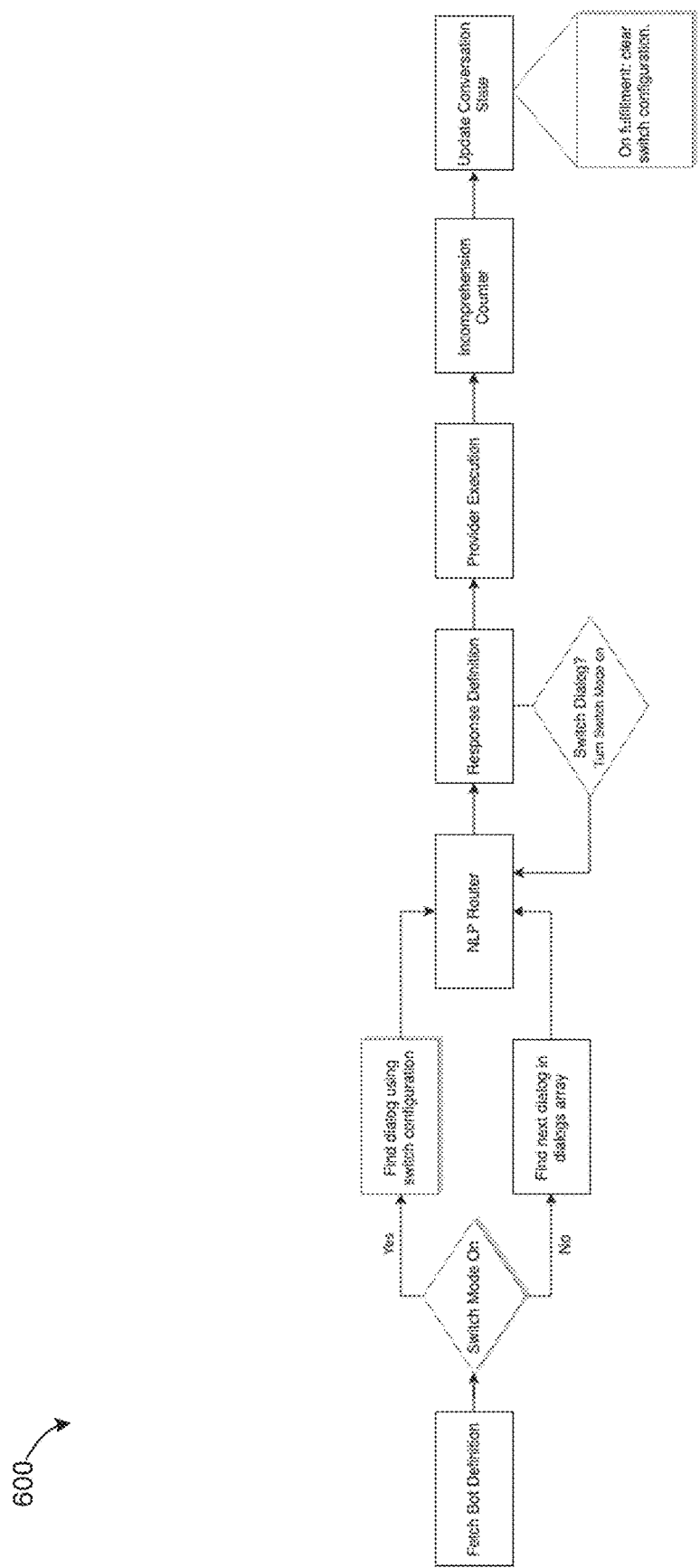
FIG. 6 is a diagram showing a visualization of an exemplary process for switching between natural language processing units during an interaction using the exemplary dialog delegation processor of FIG. 4, according to embodiments of the technology described herein.

As illustrated in FIG. 6, the method steps for a dialog delegation processor 310 include fetching the NLP 350's definition 320 which holds the dialogs array, looping through the array, while the state of the conversation 330 is "Incomprehension," calling the NLP 350 associated with the dialog definition passing of the values it expects from the conversation state 330 and other available data. Once a response 420 has been classified, the dialog delegation processor 310 selects the appropriate response definition, sometimes called dialog script. The system deduces the correct one based on the state of the conversation and intent definition primarily. However, in some embodiments, if the NLP 350 has the ability of adding dialog delegation to the state and the runtime conditions are met, the executing function detects this and turns the dialog delegation mode on. NLP 350 adds the dialog delegate configuration to the state under the dialogDelegate object and it sets flags to activate the execution of the dialog delegate code in the current function. Recursion is utilized for this, given that the current executing function holds the responsibility of classifying an intent, ensuring that the NLP 350 updates its dialog state and then resolves the proper response definition for the interaction. This is one of the points in time when delegation can happen.

Once the dialog state changes out of incomprehension, the final response template is selected based on runtime conditions if any is given, or defaults are chosen. In some embodiments, responses can also provide a definition for dialog delegation. In other embodiments, the only necessary condition that needs to exist at this point to decide if delegation needs to be activated, is to have that definition present in the response template. This will also add dialog delegate configuration to the state under the dialogDelegate object and it sets flags to activate the execution of the dialog delegate code in the current function. This is a different function, and is the one looping over the different dialogs, but with the associated runtime flags, looping is skipped, and the dialog definition is always forced to be that of the dialog delegate object.

In some embodiments, once the intent that was invoked to be completed by delegation is fulfilled, the dialogDelegated related values runtime are reset and the dialog delegation mode is turned off. In some embodiments, if the delegated dialog returns an incomprehension, the state will clear out of the dialog delegation and return control of the interactions to the default array of dialogs.

Figure 7:
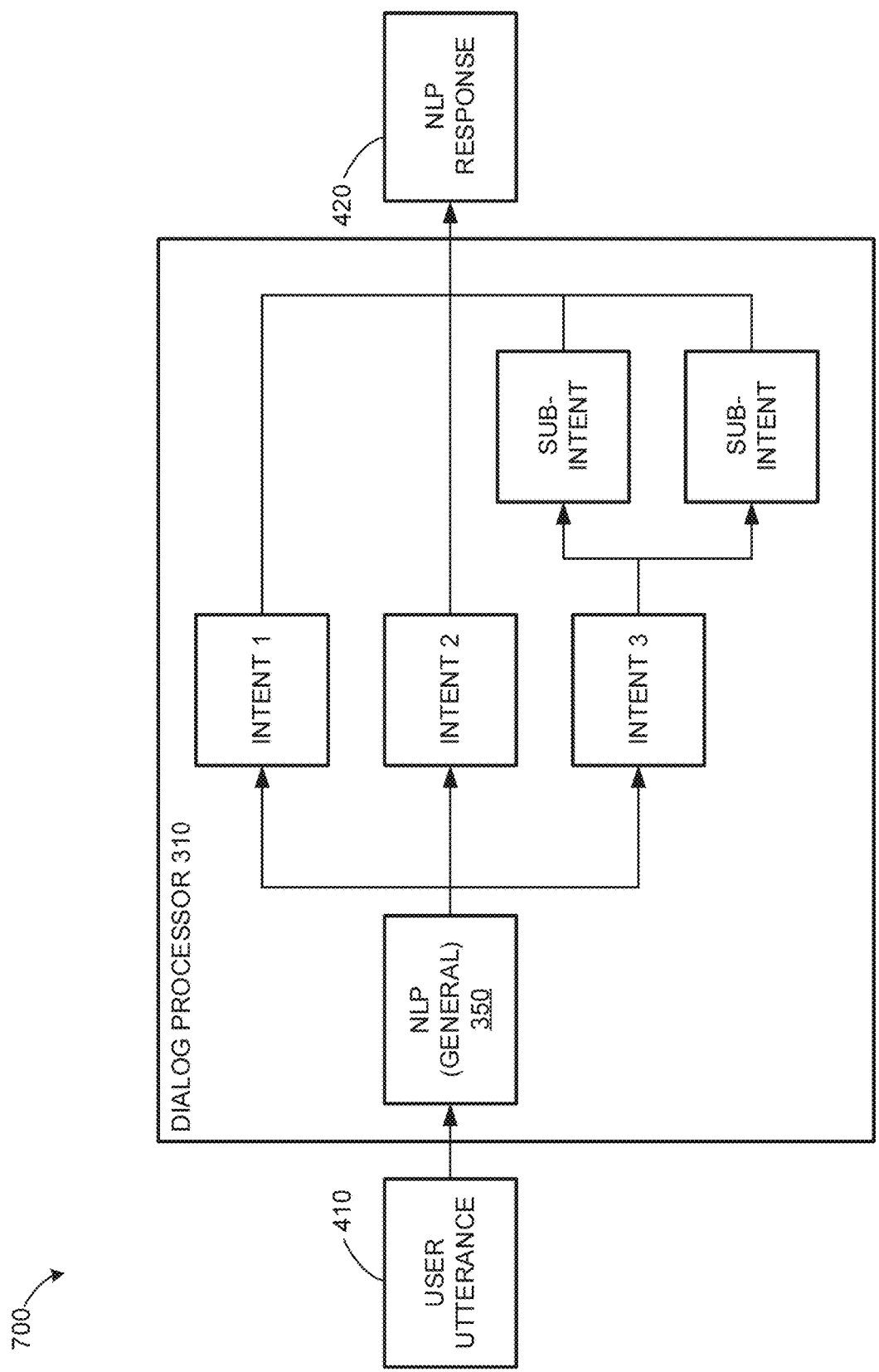
FIG. 7 is a diagram showing a visualization of an exemplary dialog delegation processor of the dialog processing system of FIG. 3, according to embodiments of the technology described herein.

Referring to FIG. 7, there are situations when a single intent requires the collection of a lot of information. It is easier to break them down into multiple smaller intents that focus on collecting specific data. In some embodiments, dialog processor 310 connects the fulfillment of one intent to the initiation of the next until all the data needed for fulfillment has been collected. This makes complex intent definitions easier to manage and error handling is more focused. That is, as the sections or the intent are broken out, it is easier to add error handling blocks without polluting the conversation design configuration.

Figure 8:
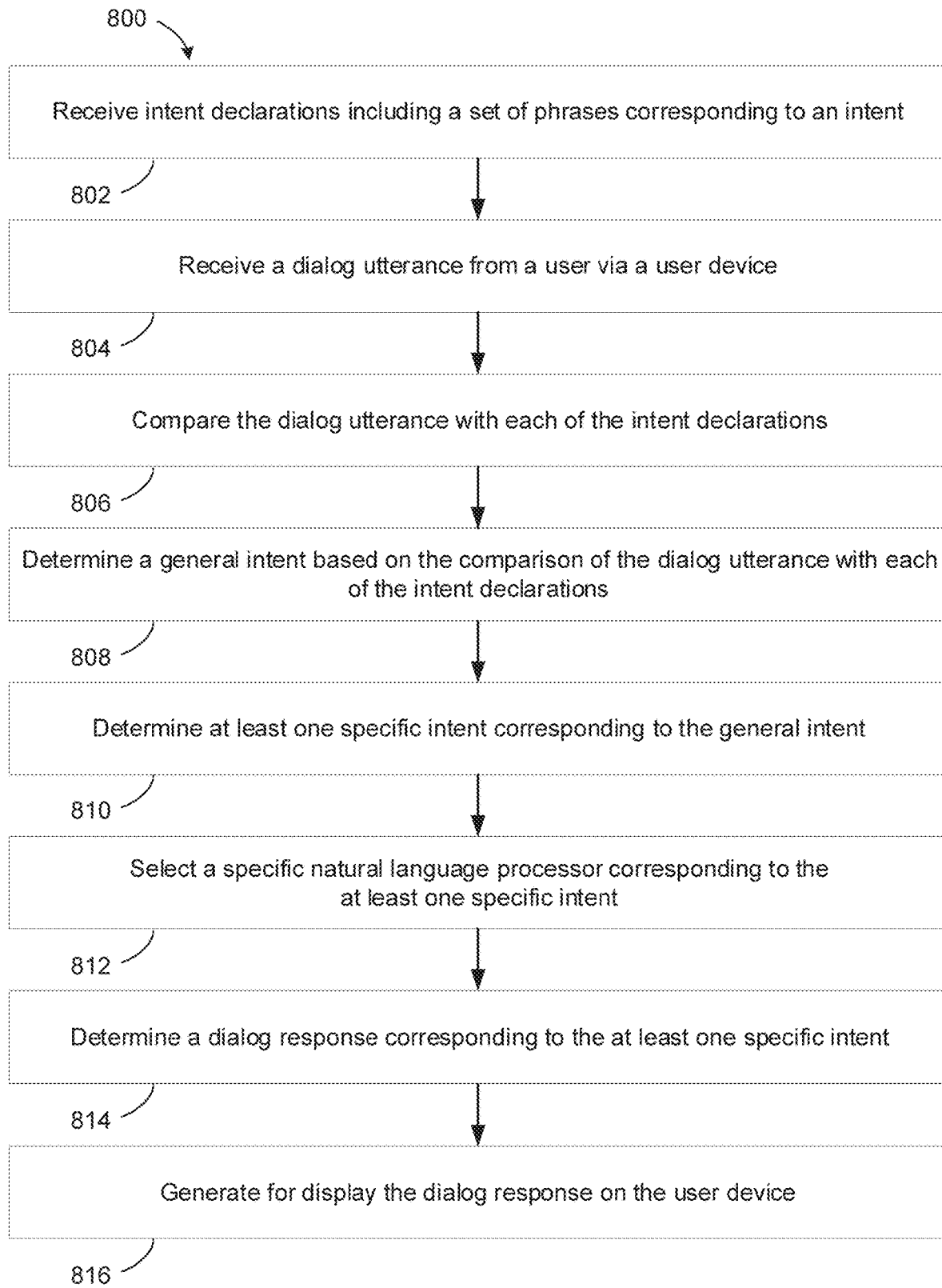
FIG. 8 is a flow diagram of a computer-implemented method for switching between natural language processing units during an interaction using an exemplary dialog delegation processor, according to embodiments of the technology described herein.

An exemplary process 800 for switching between natural language processing units 350 during an interaction using a dialog delegation processor 310 is illustrated in FIG. 8. The process 800 begins by receiving, by a server computing device 200, intent declarations in step 802. Each intent declaration includes a set of phrases corresponding to an intent of a user. Process 800 continues by receiving, by the server computing device 200, a dialog utterance 410 from the user via a user device 250 in step 804. Process 800 continues by comparing, by the server computing device 200, the dialog utterance 410 with each of the intent declarations using a general natural language processor 350 in step 806.

Process 800 continues by determining, by the server computing device 200, a general intent based on the comparison of the dialog utterance 410 with each of the intent declarations using the general natural language processor 350 in step 808. The general intent includes specific intents. Process 800 continues by determining, by the server computing device 200, at least one of the specific intents corresponding to the general intent based on the comparison of the dialog utterance 410 with each of the intent declarations using the general natural language processor 350 in step 810.

Process 800 continues by selecting, by the server computing device 200, a specific natural language processor 350 corresponding to the at least one of the specific intents in step 812. Process 800 continues by determining, by the server computing device 200, a dialog response 420 corresponding to the at least one of the specific intents using the specific natural language processor 350 in step 814. Process 800 finishes by generating, by the server computing device 200, for display the dialog response 420 on the user device 250 in step 816.

In some embodiments, the server computing device 200 is further configured to determine a second specific intent corresponding to the general intent. For example, in some embodiments, the server computing device 200 is further configured to select a second specific natural language processor 350 corresponding to the second specific intent. In some embodiments, the server computing device 200 is further configured to determine a second dialog response corresponding to the second specific intent using the second specific natural language processor 350. For example, in some embodiments, the server computing device 200 is further configured to generate for display the second dialog response on the user device.

In some embodiments, the server computing device 200 is further configured to determine an incomprehension based on the dialog utterance 410 using the general natural language processor 350. For example, in some embodiments, the server computing device 200 is further configured to, in response to determining the incomprehension, generate for display an error message on the user device 250.

In some aspects, process 800 can be implemented on a system for switching between natural language processing units 350 during an interaction using a dialog delegation processor 310. The system includes a server computing device 200 communicatively coupled to a user device 250 over a network 150. The server computing device 200 is configured to receive intent declarations. Each intent declaration includes a set of phrases corresponding to an intent of a user. The server computing device 200 is also configured to receive a dialog utterance 410 from the user via the user device 250. Further, the server computing device 200 is configured to compare the dialog utterance 410 with each of the intent declarations using a general language processor 350. The server computing device 200 is also configured to determine a general intent based on the comparison of the dialog utterance with each of the intent declarations using the general natural language processor 350. The general intent includes specific intents.

Further, the server computing device 200 is configured to determine at least one of the specific intents corresponding to the general intent based on the comparison of the dialog utterance 410 with each of the intent declarations using the general natural language processor 350. The server computing device 200 is further configured to select a specific natural language processor 350 corresponding to the at least one of the specific intents. The server computing device 200 is also configured to determine a dialog response 420 corresponding to the at least one of the specific intents using the specific natural language processor 350. Further, the server computing device 200 is configured to generate for display the dialog response on the user device 250.

In some embodiments, the server computing device 200 is further configured to determine a second specific intent corresponding to the general intent. For example, in some embodiments, the server computing device 200 is further configured to select a second specific natural language processor 350 corresponding to the second specific intent. In some embodiments, the server computing device 200 is further configured to determine a second dialog response corresponding to the second specific intent using the second specific natural language processor 350. For example, in some embodiments, the server computing device 200 is further configured to generate for display the second dialog response on the user device.

In some embodiments, the server computing device 200 is further configured to determine an incomprehension based on the dialog utterance 410 using the general natural language processor 350. For example, in some embodiments, the server computing device 200 is further configured to, in response to determining the incomprehension, generate for display an error message on the user device 250.

Figure 9:
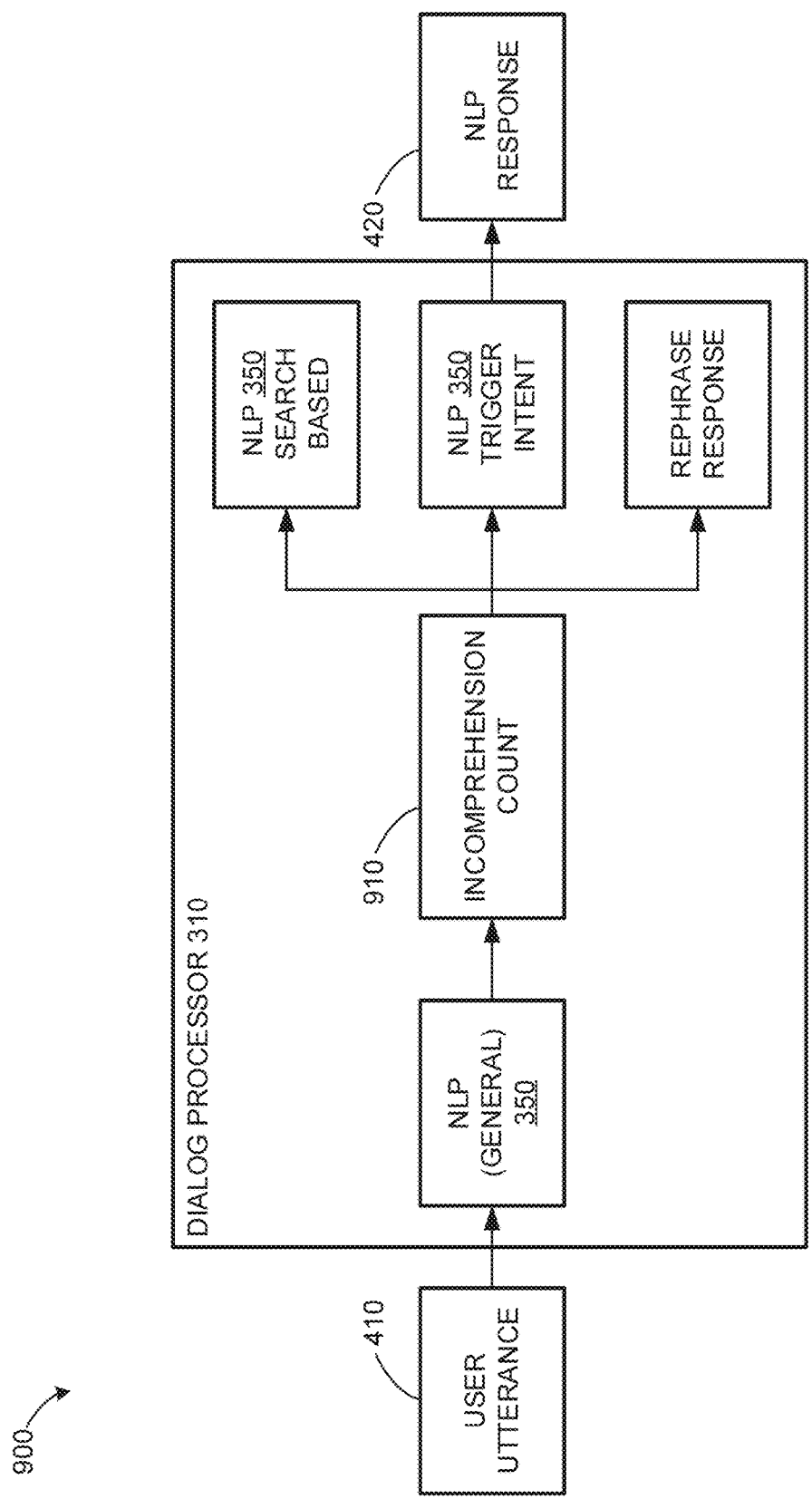
FIG. 9 is a diagram showing a visualization of an exemplary dialog delegation processor of the dialog processing system of FIG. 3, according to embodiments of the technology described herein.

Referring to FIG. 9, an exemplary dialog delegation processor 310 is illustrated for incomprehension delegation. Incomprehensions occur when an NLP 350 is not able to resolve the user utterance 410. This can happen for many reasons, for example, badly formed sentences, poor grammar that the NLP 350 is not trained to handle, or simply not having the intent in the knowledge base. In some embodiments, after an N number of incomprehensions, the dialog processor 310 looks at the configurations and decides which NLP 350 to delegate to. The system has an "escalation" configuration in place that holds information specific to each team, for example, phone number to call in, message, links or other organization specific values. At runtime, the conversation state stores an incomprehension counter 910, the dialog processor 310 then checks runtime values, the incomprehension counter 910, and other pertinent context, and decides if it should execute incomprehension delegation. Based on the incomprehension count value, the dialog processor 310 selects the correct configuration information. For example, in some embodiments, the dialog processor 310 executes a search language processor after two incomprehensions, and after a third incomprehension the dialog processor 310 asks the user if they want to speak to a representative (human).

Figure 10:
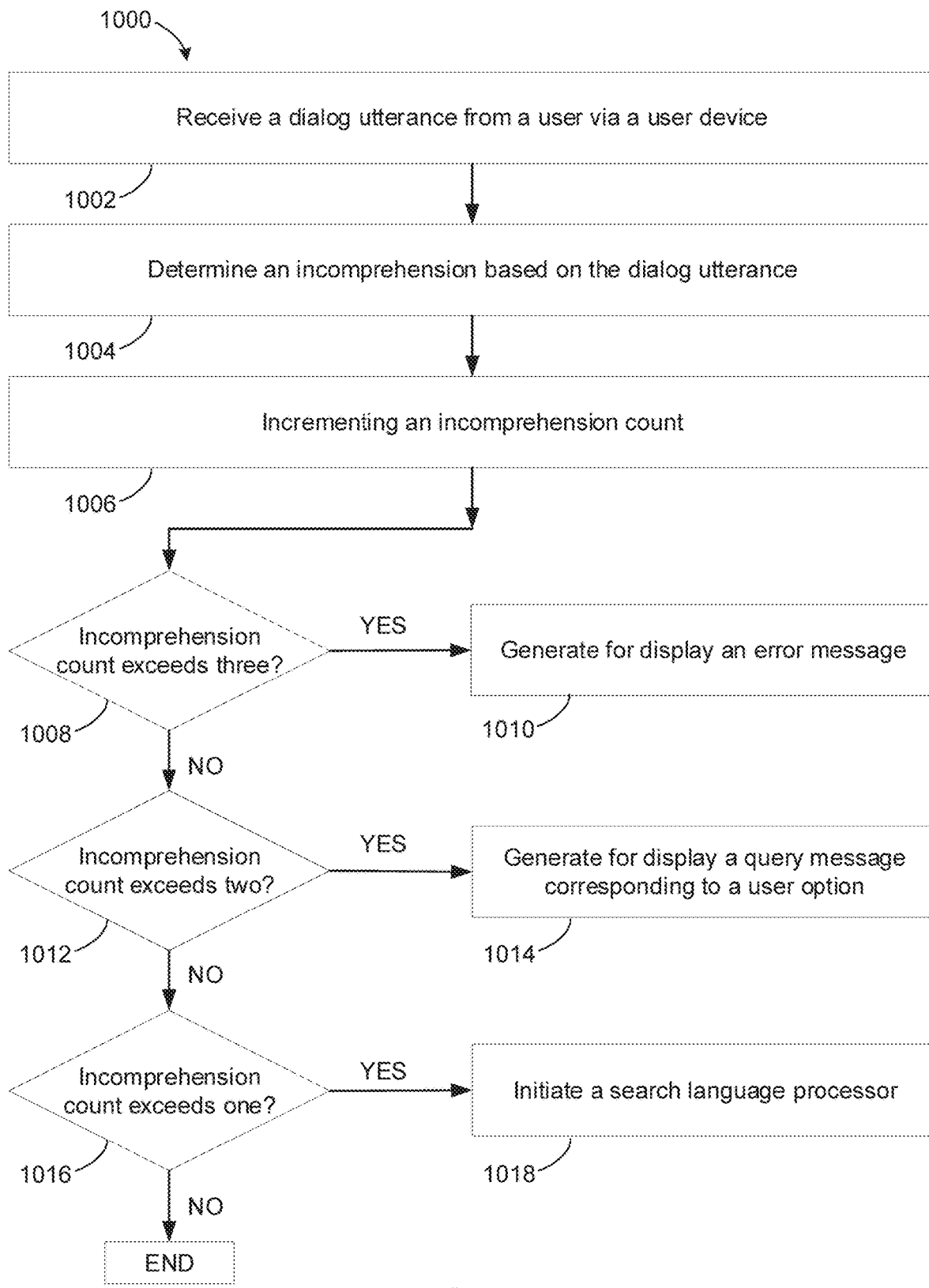
FIG. 10 is a flow diagram of a computer-implemented method for resolving dialog incomprehension using an exemplary dialog delegation processor, according to embodiments of the technology described herein.

An exemplary process 1000 for resolving dialog incomprehension using a dialog delegation processor 310 is illustrated in FIG. 10. The process 1000 begins by receiving, by a server computing device 200, a dialog utterance 410 from a user via a user device 250 in step 1002. Process 1000 continues by determining, by the server computing device 200, an incomprehension based on the dialog utterance 410 using a general natural language processor 350 in step 1004. In response to determining the incomprehension, process 1000 continues by incrementing, by the server computing device 200, an incomprehension count 910 in step 1006.

Process 1000 continues by determining whether the incomprehension count 910 exceeds three in step 1008. In response to determining that the incomprehension count 910 exceeds three, process 1000 continues by generating, by the server computing device 200, for display an error message in step 1010. Otherwise, process 1000 continues by determining whether the incomprehension count 910 exceeds two in step 1012. In response to determining that the incomprehension count 910 exceeds two, process 1000 continues by generating, by the server computing device 200, for display a query message corresponding to a user option in step 1014. Otherwise, process 1000 continues by determining whether the incomprehension count 910 exceeds one in step 1016. In response to determining that the incomprehension count 910 exceeds one, process 1000 continues by initiating, by the server computing device 200, a search language processor in step 1018.

In some embodiments, the search language processor is configured to determine an intent based on the dialog utterance 410. For example, in some embodiments, the server computing device 200 is further configured to select a natural language processor 350 corresponding to the determined intent. In some embodiments, the server computing device 200 is further configured to determine a dialog response 420 corresponding to the determined intent using the natural language processor 350. In other embodiments, the user option includes speaking with a human. In some embodiments, the server computing device 200 is further configured to receive a rephrased dialog utterance from the user via the user device 250.

In some aspects, process 1000 can be implemented on a system for resolving dialog incomprehension using a dialog delegation processor 310. The system includes a server computing device 200 communicatively coupled to a user device 250 over a network 150. The server computing device 200 is configured to receive a dialog utterance 410 from a user via the user device 250. Further, the server computing device 200 is configured to determine an incomprehension based on the dialog utterance 410 using a general natural language processor 350. In response to determining the incomprehension, the server computing device is also configured to increment an incomprehension count 910.

Further, the server computing device 200 is configured to determine whether the incomprehension count 910 exceeds three. In response to determining that the incomprehension count 910 exceeds three, the server computing device 200 is configured to generate for display an error message. Otherwise, the server computing device 200 is configured to determine whether the incomprehension count 910 exceeds two. In response to determining that the incomprehension count 910 exceeds two, the server computing device 200 is configured to generate for display a query message corresponding to a user option. Otherwise, the server computing device 200 is configured to determine whether the incomprehension count 910 exceeds one. In response to determining that the incomprehension count 910 exceeds one, the server computing device is configured to initiate a search language processor.

In some embodiments, the search language processor is configured to determine an intent based on the dialog utterance 410. For example, in some embodiments, the server computing device 200 is further configured to select a natural language processor 350 corresponding to the determined intent. In some embodiments, the server computing device 200 is further configured to determine a dialog response 420 corresponding to the determined intent using the natural language processor 350. In other embodiments, the user option includes speaking with a human. In some embodiments, the server computing device 200 is further configured to receive a rephrased dialog utterance from the user via the user device 250.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for switching between natural language processing units during an interaction using a dialog delegation processor, the method comprising:

receiving, by a server computing device, a plurality of intent definitions, wherein each intent definition is associated with a different one of a plurality of natural language processors connected to the server computing device and comprises a set of dialog responses to an intent associated with a user utterance;

receiving, by the server computing device, a dialog utterance from the user via a user device, the dialog utterance associated with a first dialog flow and a conversation state;

invoking, by the server computing device, each of the plurality of natural language processors using the dialog utterance until a first one of the natural language processors classifies the dialog utterance with a general intent of the user, including incrementing an incomprehension counter for each natural language processor that does not classify the dialog utterance with a general intent of the user and requesting a rephrased dialog utterance from the user when the incomprehension count exceeds a predetermined threshold;

comparing, by the server computing device, the general intent of the user with the plurality of intent definitions to identify a dialog response to the general intent, the identified dialog response comprising a delegation to a second dialog flow that references a second one of the plurality of natural language processors and wherein the second natural language processor is referenced in the delegation according to a first specific intent corresponding to the general intent of the user;

invoking, by the server computing device, the second natural language processor based upon the identified dialog response to execute the second dialog flow;

receiving, by the second natural language processor, the conversation state and the dialog utterance;

generating, by the second natural language processor, a dialog response to the dialog utterance;

updating, by the second natural language processor, the conversation state;

returning, by the second natural language processor, the dialog response and updated conversation state to the first natural language processor via the server computing device;

returning, by the first natural language processor, a response to the server computing device based upon the dialog response and updated conversation state received from the second natural language processor; and displaying, by the server computing device, the dialog response received from the second natural language processor on the user device as part of the first dialog flow.

2. The computerized method of claim 1, wherein the server computing device is further configured to determine a second specific intent corresponding to the general intent using the second natural language processor.

3. The computerized method of claim 2, wherein the server computing device compares the second specific intent with the plurality of intent definitions to identify a sub-action responsive to the second specific intent, the identified sub-action comprising a delegation to a third dialog flow that references a third one of the plurality of natural language processors and wherein the third natural language processor is referenced in the delegation according to a third specific intent corresponding to the general intent of the user.

4. The computerized method of claim 3, wherein the server computing device invokes the third natural language processor based upon the identified sub-action to execute the third dialog flow, wherein the third natural language processor receives the conversation state and the dialog utterance, generates a dialog response to the dialog utterance, updates the conversation state, and transmits the dialog response and updated conversation state to the second natural language processor via the server computing device.

5. The method of claim 1, wherein the general intent of the user is associated with a domain context and the second natural language processor generates dialog responses containing content associated with the domain context.

6. A system for switching between natural language processing units during an interaction using a dialog delegation processor, the system comprising a server computing device communicatively coupled to a user device over a network and comprising a memory for storing computer-executable instructions and a processor that executes the computer executable instructions to:

receive a plurality of intent definitions, wherein each intent definition is associated with a different one of a plurality of natural language processors connected to the server computing device and comprises a set of dialog responses to an intent associated with a user utterance;

receive a dialog utterance from the user via the user device, the dialog utterance associated with a first dialog flow and a conversation state;

invoke each of the plurality of natural language processors using the dialog utterance until a first one of the natural language processors classifies the dialog utterance with a general intent of the user, including incrementing an incomprehension counter for each natural language processor that does not classify the dialog utterance with a general intent of the user and requesting a rephrased dialog utterance from the user when the incomprehension count exceeds a predetermined threshold;

compare the general intent of the user with the plurality of intent definitions to identify a dialog response to the general intent, the identified dialog response comprising a delegation to a second dialog flow that references a second one of the plurality of natural language processors and wherein the second natural language processor is referenced in the delegation according to a first specific intent corresponding to the general intent of the user;

invoke the second natural language processor based upon the identified dialog response to execute the second dialog flow, wherein the second natural language processor:
receives the conversation state and the dialog utterance,
generates a dialog response to the dialog utterance,
updates the conversation state, and
returns the dialog response and updated conversation state to the first natural language processor via the server computing device;

wherein the first natural language processor returns a response to the server computing device based upon the dialog response and updated conversation state received from the second natural language processor; and the server computing device displays the dialog response received from the second natural language processor on the user device as part of the first dialog flow.

7. The system of claim 6, wherein the server computing device further determines a second specific intent corresponding to the general intent using the second natural language processor.

8. The system of claim 7, wherein the server computing device compares the second specific intent with the plurality of intent definitions to identify a sub-action responsive to the second specific intent, the identified sub-action comprising a delegation to a third dialog flow that references a third one of the plurality of natural language processors and wherein the third natural language processor is referenced in the delegation according to a third specific intent corresponding to the general intent of the user.

9. The system of claim 8, wherein the server computing device invokes the third natural language processor based upon the identified sub-action to execute the third dialog flow, wherein the third natural language processor receives the conversation state and the dialog utterance, generates a dialog response to the dialog utterance, updates the conversation state, and transmits the dialog response and updated conversation state to the second natural language processor via the server computing device.

10. The system of claim 6, wherein the general intent of the user is associated with a domain context and the second natural language processor generates dialog responses containing content associated with the domain context.

* * * * *